United States Patent [19]

Pacozzi

[11] 4,172,256

[45] Oct. 23, 1979

[54] CIRCUIT FOR SPEED MEASUREMENT OF VEHICLES ACCORDING TO THE DOPPLER-RADAR PRINCIPLE

[75] Inventor: Pierino Pacozzi, Zürich, Switzerland

[73] Assignee: Siemens-Albis Aktiengesellschaft, Zürich, Switzerland

[21] Appl. No.: 874,506

[22] Filed: Feb. 2, 1978

[30] Foreign Application Priority Data

Feb. 16, 1977 [CH] Switzerland ........................ 1898/77

[51] Int. Cl.[2] ................................................ G01S 9/44

[52] U.S. Cl. ........................................................ 343/8

[58] Field of Search ............................................ 343/8

[56] References Cited

U.S. PATENT DOCUMENTS

| | | | |
|---|---|---|---|
| 3,787,853 | 1/1974 | Brookner | 343/8 |
| 4,101,890 | 7/1978 | Goyard | 343/8 |

*Primary Examiner*—Maynard R. Wilbur
*Assistant Examiner*—Richard E. Berger
*Attorney, Agent, or Firm*—Werner W. Kleeman

[57] ABSTRACT

A circuit for speed measurement of vehicles according to the Doppler-radar principle wherein a Doppler-useful signal is evaluated in a computer to which such signal is infed by means of a threshold value switch. A single sideband modulator is provided, at the input side of which there is supplied the Doppler-useful signal and also a high-frequency signal produced by a high-frequency oscillator. The output side of the single-sideband modulator is connected with the input of a phase-locked loop, the output signal of which is converted into the original frequency band of the Doppler signal by means of a demodulator connected at its output side with the input of the threshold value switch.

7 Claims, 2 Drawing Figures

CIRCUIT FOR SPEED MEASUREMENT OF VEHICLES ACCORDING TO THE DOPPLER-RADAR PRINCIPLE

BACKGROUND OF THE INVENTION

The present invention relates to a new and improved construction of circuit for speed or velocity measurement of vehicles according to the Doppler-radar principle, wherein a Doppler-useful signal is evaluated in a computer to which it is delivered by means of a threshold value switch.

In order to influence the vehicle speed during railroad-freight car-shunting operations there are employed track brakes. To control these track brakes the velocity of the railroad cars must be continuously measured with high accuracy. In this respect it is known, as taught for instance in the publication "Eisenbahningenieur" 17 (1966) 5, in the article entitled "Geschwindigkeitsmessungen mit Radar in automatischen Ablaufanlagen", to use for this purpose radar devices which work in accordance with the Doppler principle.

During velocity measurements carried out with such heretofore known radar installations, electromagnetic waves are produced in a small transmitter and transmitted by means of a radar antenna. A vehicle within the measuring region reflects part of the impinging energy. The reflected signal is received by the antenna and mixed in a mixer with the transmitted signal. At a subsequently connected low-pass filter and an amplifier there is filtered out of the mixed product the Doppler frequency and measured. Consequently, the magnitude of the vehicle velocity in m/s can be calculated from the equation $f_d \approx 6.67 \cdot f \cdot v \cdot \cos \alpha$ wherein $f_d$ is the Doppler frequency in Hz, $\alpha$ is the angle between the transmitted beam and the direction of movement of the vehicle, and f is the transmitter frequency in GHz.

In this known radar installation the Doppler frequency signals are transformed by means of a dual or double range-threshold value switch into squarewave or rectangular pulses which are further processed in an evaluation circuit or in a computer.

Such prior art velocity measuring device has been found to be unfavorable as concerns the sensitivity of the device, especially for railway-freight car-shunting operations, since the fixed predetermined response thresholds must be selected to be considerably wide apart in order to avoid the effects of noise signals. Additionally, such equipment cannot bring about any gap fill during fading and cannot smooth phase shifts, such as for instance occur during slight pivotal or rocking movements of the freight cars.

It is also known to the art from German patent publication No. 2,324,271 to incorporate into a circuit for the measurement of the displacement path or velocity of vehicles, while utilizing a Doppler-radar device, a synchronizable oscillator after the threshold value switch and directly in front of the evaluation circuit. This oscillator must be capable of being synchronized over a wide frequency range.

With such circuit it is possible to correct phase shifts or changes and amplitude breakdown. But this circuit is still disadvantageous as concerns sensitivity. If the noise is eliminated by having widely spaced response thresholds of the threshold value switch, then the circuit becomes extremely insensitive, whereby frequently it is not possible to obtain any synchronization signal, during a longer time span, for the synchronizable oscillator.

On the other hand, if the response thresholds are selected to be just slightly above the noise level, then the effect of noise in the synchronizable oscillator must be eliminated by a low-pass filter. As a result, the circuit becomes too slow or sluggish, since the time-constant of the low-pass filter must be relatively large in order to be able to also process extremely small Doppler frequencies up to several Hz.

SUMMARY OF THE INVENTION

Therefore, with the foregoing in mind it is a primary object of the present invention to provide an improved circuit for velocity measurement of vehicles according to the Doppler-radar principle and in a manner not associated with the aforementioned drawbacks and limitations of the prior art proposals.

Another and more specific object of the present invention aims at the provision of a sensitive, but at the same time relatively rapidly operating circuit which, during the velocity measurement of vehicles, while utilizing a Doppler-radar device, delivers to a computer or other evaluation means Doppler frequency signals free of amplitude breakdown and phase shift.

Now in order to implement these and still further objects of the invention, which will become more readily apparent as the description proceeds, the circuit of the present development is manifested by the features that there is provided a single-sideband modulator which has supplied to the input side thereof both the Doppler-useful signal and a high-frequency signal produced by a high-frequency oscillator. The output side of the single-sideband modulator is connected with the input or input side of a phase-locked loop, the output signal of which is transformed into the original frequency band of the Doppler signal by means of a demodulator connected at its output side with the input of the threshold value switch.

Such circuit has the advantage of being able to compensate relatively rapid, brief amplitude breakdowns and phase shifts, as such are especially caused by jerky-type positional changes of the vehicles, while maintaining relatively great sensitivity.

This advantage is even further augmented if, according to a further manifestation of the invention, a control line of the oscillator contained in the phase-locked-loop, is connected with a holder circuit. Upon absence of synchronization this holder circuit maintains the previous control signal, and therefore, in this case it is also possible to compensate particularly longer amplitude breakdowns.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
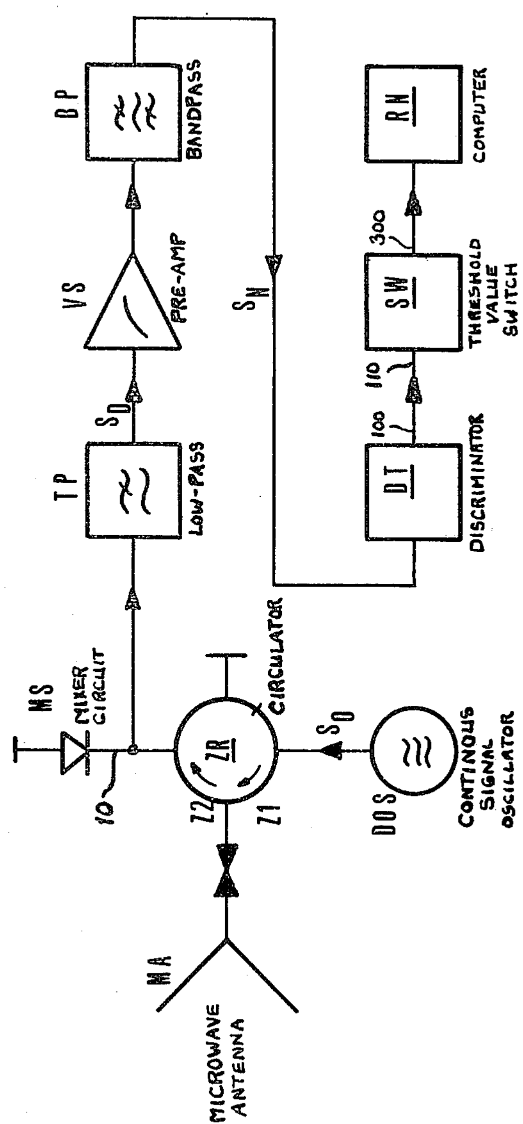
FIG. 1 is a block circuit diagram of an arrangement constructed according to the present invention for measuring the speed or velocity of vehicles.

Referring now to the drawings, the circuit of FIG. 1 working according to the Doppler principle consists, in principle, of a circulator ZR with which there are connected a continuous-signal or continuous signal oscillator DOS, a microwave antenna MA and a mixer circuit MS. The output 10 of the mixer circuit or mixer MS is connected by means of the series circuit of a low-pass filter or network TP, a pre-amplifier VS, a bandpass filter BP, a discriminator DT, and a double range-threshold value switch SW with a computer RN which delivers an output signal as a function of the speed or velocity of the monitored vehicle. According to the invention, the discriminator DT is directly connected forwardly of and in circuit with the threshold value switch SW.

The continuous-signal oscillator DOS delivers a continuous signal $S_O$ by means of the first arm Z1 of the circulator ZR to the microwave antenna MA, for instance a horn antenna. This horn antenna MA transmits the continuous signal $S_O$ in the direction of a vehicle, for instance a railway freight car undergoing a shunting operation, and the velocity or speed of which is to be measured. The echo signal reflected by the railway freight car is received by the antenna MA, arrives by means of the second arm Z2 of the circulator ZR at the mixer circuit MS, for instance a mixer diode circuit, and at that location is mixed with part of the continuous signal $S_O$. From the resultant mixed product there is filtered, by means of the low-pass filter TP, a low-frequency Doppler signal $S_D$. This filtered-out low-frequency Doppler signal $S_D$ is amplified in the pre-amplifier VS. The subsequent series connected band-pass filter BP filters out of this amplified Doppler signal a Doppler-useful signal $S_N$ lying within a desired frequency band. In the subsequently connected discriminator DT, the Doppler-useful signal $S_N$ is freed of disturbing influences of the heretofore-mentioned type. Thereafter there is obtained from the disturbance-free Doppler-useful signal, at the threshold value switch SW, a digital rectangular or square-wave signal of the same frequency, which is then evaluated by the computer RN.

Due to the large dynamic range of its input signal the pre-amplifier VS, in order to reduce harmonics, advantageously can be dimensioned in such a manner that it operates linearly for small signals and logarithmically for large signals.

Figure 2:
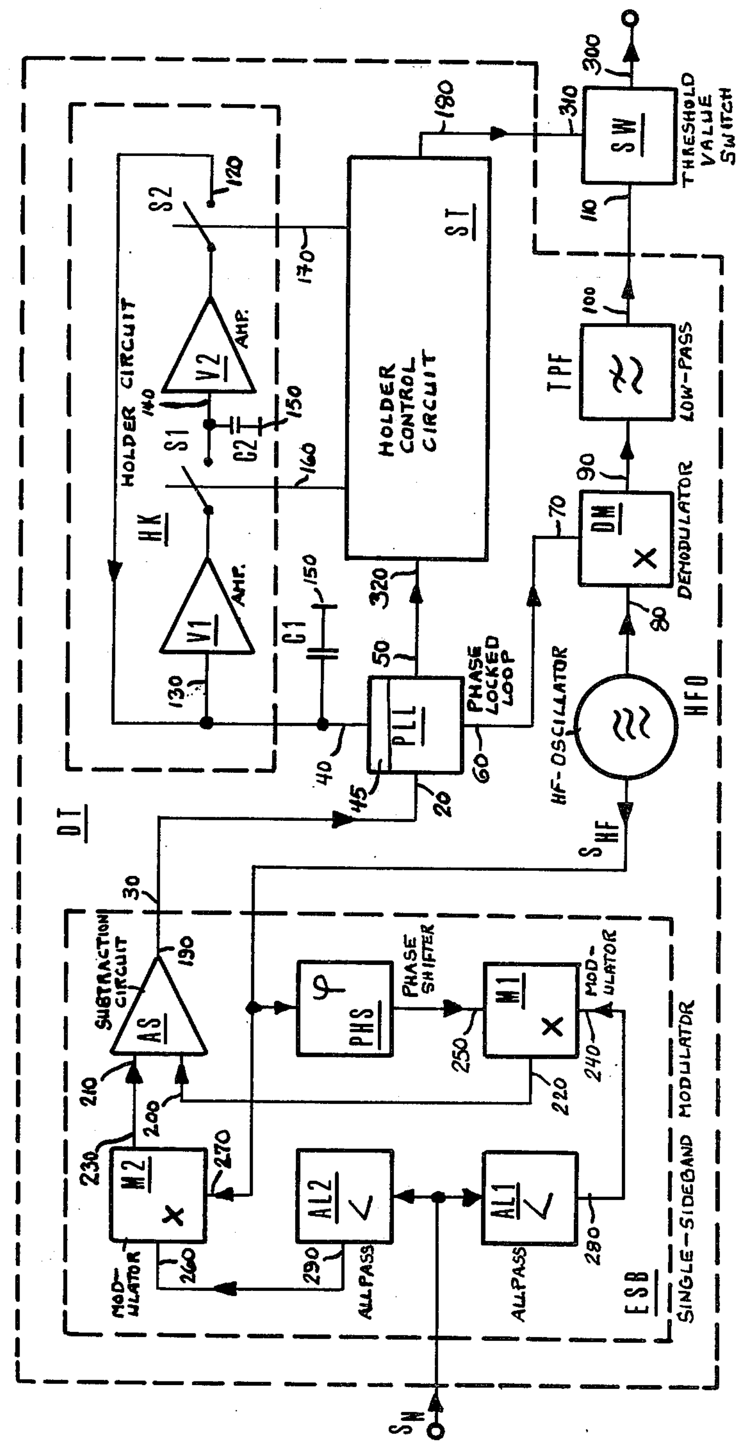
FIG. 2 illustrates details of a discriminator for the velocity measuring circuitry of FIG. 1.

In the discriminator DT, provided as contemplated by the invention, and as will be apparent from the showing of FIG. 2, a phase-locked-loop PLL is provided, which is connected at its input side 20 with the output 30 of a single-sideband suppressed-carrier modulator ESB to which there is supplied a high-frequency signal $S_{HF}$ delivered by a high-frequency oscillator HFO. The control line 40 of the oscillator contained in the phase-locked-loop PLL and generally indicated by reference character 45 is coupled with a holder circuit HK which, in the absence of synchronization, maintains the relevant control signal. By means of a reporting signal output 50, the phase-locked-loop PLL can be coupled with a holder circuit-control ST, and by means of a signal output 60 the phase-locked-loop PLL is connected with the first input 70 of a demodulator DM. The second input 80 of this demodulator DM is supplied with the high-frequency signal $S_{HF}$ of the high-frequency oscillator HFO and the output 90 of which is connected with a low-pass filter TPF. The output 100 of this low-pass filter TPF simultaneously constitutes the output of the discriminator DT and therefore is connected with the input 110 of the threshold value switch SW, as also seen by referring to FIG. 1.

The holder circuit HK possesses a series circuit of a first amplifier V1, a first switch S1, a second amplifier V2, and a second switch $S_2$. The output 120 of the second switch $S_2$ as well as the input 130 of the first amplifier $V_1$ are connected with the control line 40 of the phase-locked-loop PLL. The respective inputs 130 and 140 of both amplifiers V1 and V2 are each connected by means of a holder element, for instance a capacitor $C_1$ and $C_2$, respectively, with a suitable reference potential, generally indicated by reference character 150. The switches S1 and S2 are controllable by the holder circuit-control ST by means of a respective control output 160 and 170 thereof. The threshold value switch SW is additionally connected with the holder circuit-control ST by means of a third control output 180.

In the discriminator DT of FIG. 2, there can be employed the most different variant constructions of a single-sideband modulator ESB. A preferred form of single-sideband modulator ESB, according to the showing of FIG. 2, will be seen to comprise a subtraction circuit AS, the output 190 of which also forms the output 30 of the entire single-sideband modulator ESB. The subtraction circuit AS has two inputs 200 and 210 and the first such input 200 is connected with the output 220 of a first modulator M1 and the second such input 210 is connected with the output 230 of a second modulator M2. Supplied to the first modulator M1, on the one hand, is the Doppler-useful signal $S_N$ (FIG. 1), at its input 240, by means of a first allpass filter or network AL1 and, on the other hand, at its other input 250, the high-frequency signal $S_{HF}$ by means of a 90°-phase shifter PHS. There is supplied to the second modulator M2, on the one hand, at its input 260, the Doppler-useful signal $S_N$ (FIG. 1) by means of a second allpass filter AL2 and, on the other hand, at its other input 270, the high-frequency signal $S_{HF}$ itself.

Having now had the benefit of the foregoing description of the circuit, its operation will be considered and is as follows:

The allpass filters AL1 and AL2 cause a mutual phase shift of 90° of their output signals appearing at their respective outputs 280 and 290 over the desired frequency range. The modulators M1 and M2 multiply the Doppler-useful signals $S_N$ filtered by the relevant allpass filters AL1 and AL2, respectively, with two high-frequency signals which are phase-shifted through 90° relative to one another. In the subtraction circuit AS there is eliminated a sideband. By means of the output 190 of the subtraction circuit AS, there is supplied to the signal input 20 of the phase-locked-loop PLL a high-frequency signal $S_{HF}$ which is modulated at a single-sideband by the Doppler-useful signal. The output signal of the phase-locked-loop PLL, in the ideal case, coincides with the input signal thereof. An ideal case then only would be present if the Doppler signal does not have any amplitude breakdown and no phase shifts. The output signal of the phase-locked-loop PLL which appears at its output 60 is again converted in the demodulator DM into the original frequency band of the Doppler signal and delivered by means of the low-pass filter TPF to the output 300 of the threshold value switch SW.

If in contrast to the ideal case, the input signal of the phase-locked-loop PLL continuously does not contain any modulated Doppler signal, then its oscillator 45 oscillates freely approximately at the middle of the frequency regulation range and there is delivered to the holder circuit-control ST a synchronization dropout-reporting signal. Based upon this signal, the control input 310 of the threshold value switch SW has supplied thereto a signal which blocks such, so that there is not delivered any output signal by the threshold value switch SW to the computer RN (FIG. 1).

On the other hand, as long as the input signal of the phase-locked-loop PLL only temporarily does not contain any modulated Doppler signal, then there comes into play the holder circuit HK. This functions in the following manner: as long as the phase-locked-loop PLL works in its synchronized state and there does not appear any synchronization dropout-reporting signal at the input 320 of the holder circuit-control ST, then the switch S1 remains closed and the switch S2 open. The signal appearing at the control line 40 of the oscillator contained in the phase-locked-loop PLL is delivered via the amplifier V1 and the closed switch S1 to the holder element C2 and there stored. With dropout of the Doppler signal, the holder circuit-control ST receives a synchronization dropout-reporting signal, and the switch S1 is opened and the switch S2 is closed. Consequently, the control signal stored at the capacitor C2 is again delivered to the control line 40 of the phase-locked-loop-oscillator, causing, in turn, that at least for a predetermined limited time the signal at the first input 70 of the demodulator DM is at least approximately equal to the signal directly available prior to dropout of the Doppler signal. If the synchronization drop-out-reporting signal again disappears, or if there has expired this predetermined time, then the switch S2 is again opened and the switch S1 is again closed. During the brief time of a momentary dropout or fall-out of the Doppler signal the output 300 of the threshold value switch SW is not blocked by the holder circuit-control ST. If, however, after a predetermined time, the synchronization dropout-reporting signal has not again disappeared, then the holder circuit-control ST continuously blocks the output 300 of the threshold value switch SW, as such has already been explained above.

According to a further construction of the invention, the voltage changes per unit of time which appear at the control line of the phase-locked-loop-oscillator can be employed as control parameters in the case of a synchronization dropout for controlling the voltage at the holder element such that the velocity measurement result can be extrapolated as a function of the past i.e. what has transpired, in other words there can be simulated the expected development of the speed of the vehicle as a function of time, and such control parameters can be obtained, for instance, based upon the first and the second derivative of the voltage changes per unit of time.

While there are shown and described present preferred embodiments of the invention, it is to be distinctly understood that the invention is not limited thereto, but may be otherwise variously embodied and practiced within the scope of the following claims. Accordingly,

What I claim is:

1. A circuit for velocity measurement of vehicles according to the Doppler-radar principle, comprising:

a computer for delivering an output signal as a function of the measured velocity of the vehicle;

means for forming a Doppler-useful signal from a Doppler-signal;

a threshold value switch for delivering the Doppler-useful signal to the computer for evaluation thereof;

a single-sideband modulator having an input side and an output side;

a high-frequency oscillator for producing a high-frequency signal delivered to the input side of the single-sideband modulator;

said forming means supplying said Doppler-useful signal to the input side of said single-sideband modulator;

a phase-locked-loop having an input side and an output side;

the output side of said single sideband modulator being connected with the input side of said phase-locked-loop;

said threshold value switch having an input;

a demodulator having an input and an output;

the output side of the phase-locked-loop being connected with the input of the demodulator and the output of said demodulator being connected with the input of said threshold value switch;

the output signal appearing at the output side of the phase-locked-loop being converted by the demodulator into the original frequency band of the Doppler signal.

2. The circuit as defined in claim 1, wherein:

said single-sideband modulator comprises a single-sideband suppressed-carrier modulator.

3. The circuit as defined in claim 1, wherein:

said phase-locked-loop embodies a synchronizable oscillator having a control line and which in the absence of synchronization delivers a synchronization dropout-reporting signal to a holder circuit;

a holder circuit;

said control line being operatively connected with said holder circuit;

said holder circuit maintaining a prior control signal in the event of synchronization dropout.

4. The circuit as defined in claim 3, wherein:

said holder circuit comprises a series circuit of a first amplifier, a first switch, a second amplifier and a second switch;

means providing a reference potential;

said second amplifier having an input;

a holder element;

said input of said second amplifier being connected via said holder element with said reference potential;

said second switch having an output;

said first amplifier having an input;

the output of said second switch being connected with the input of said first amplifier and with the control line of the phase-locked-loop; and said first switch being opened and said second switch being closed during the presence of the synchronization dropout-reporting signal for a predetermined limited time span.

5. The circuit as defined in claim 4, wherein:

said threshold value switch has an output connected with the computer;

said holder circuit embodies a holder circuit-control which blocks the output of the threshold value switch during the continuance of the synchronization dropout after expiration of said predetermined time span.

6. The circuit as defined in claim 5, wherein:

said holder circuit comprises a holder element for delivering an extrapolated voltage to the control line of the phase-locked-loop while taking into account prior voltage changes of the control signal appearing at the control line, said extrapolated voltage causing simulation of the expected development of the speed of the vehicle as a function of time.

7. The circui as defined in claim 1, wherein:

said forming means comprises a pre-amplifier arranged at the input side of the single-sideband modulator and structured for amplifying the Doppler-useful signal prior to processing in said single-sideband modulator such that small amplitudes are linearly amplified and large amplitudes logarithmically amplified in order to reduce harmonics due to large dynamic range of the input signal of the pre-amplifier.

* * * * *